UNITED STATES PATENT OFFICE.

RALPH H. McKEE, OF NEW YORK, N. Y.

METHOD OF RECOVERING PRECIOUS METALS FROM SOLUTIONS.

1,372,971.     Specification of Letters Patent.     Patented Mar. 29, 1921.

No Drawing.     Application filed May 13, 1920. Serial No. 381,197.

*To all whom it may concern:*

Be it known that I, RALPH H. McKEE, a citizen of the United States, residing at New York city, in the county of New York and State of New York, have invented certain new and useful Improvements in Methods of Recovering Precious Metals from Solutions, of which the following is a specification.

This invention is a novel method for the recovery of gold and silver from solutions thereof, such as result for example from the practice of the known cyaniding and chloridizing processes.

In processes of this type charcoal has long been employed as an adsorbent for the gold, although it has of late been largely displaced by zinc. The charcoal used is generally obtained from woods locally available, and it has been customary to heat it freshly for use. As heretofore used the volume of charcoal required for the treatment of a given volume of solution has been large, and the gold-recovery has been imperfect. For example, in a typical case the gold-bearing solution is filtered through six boxes each carrying a bed of charcoal, so disposed that the solution passes through an aggregate of some 24 linear feet of charcoal. Following this extensive treatment the solution was found still to retain approximately $0.50 in gold per ton of liquid.

I have discovered that if suitable forms of carbon, including ordinary wood charcoals, be subjected to an alkaline treatment at moderately high temperatures, and thereafter washed, their effectiveness as gold precipitants or adsorbents is very greatly increased. For this purpose wood charcoal may be heated to redness in presence either of caustic soda or sodium carbonate (or less effectively with other alkaline reagents) and thereafter washed or leached. In practice it is sufficient to moisten the charcoal with an alkaline solution of about 20% concentration, then to dry and heat to redness with exclusion of air, and finally to leach and preferably to dry the leached residue.

The method is applicable to the treatment of cyanid solutions of varying strengths, ranging for instance from 0.01% to 0.25% concentration or higher. The cyanid consumption is small, the method presenting in this respect a marked economy as compared with the use of zinc. At approximate saturation from a cyanid solution the carbon will carry about 5-7% of gold: higher percentages are occasionally observed but are not regarded as economical in practice.

The method is applicable to the recovery of the precious metals from solutions derived by chlorination; and it is likewise directly applicable to the recovery of silver from cyanid solutions. In this latter case however the saturation value of the carbon for metal is usually somewhat lower than with gold.

My invention is not restricted to the employment of wood charcoal preliminarily subjected to an alkaline treatment, since other forms of carbon or carbonaceous residues have proven effective for the purpose. For example I have demonstrated experimentally that the industrial waste material known in trade as leached black ash, a by-product from soda pulp manufacture, is effective for the purposes of this invention; and I have further demonstrated that in the use of this material there is no material contamination of the cyanid solutions from the passage into solution of highly objectionable alkaline sulfids. While this leached black ash is an efficient precipitant for the precious metals, its effectiveness for this purpose can be slightly increased by heating it afresh with an alkali, for instance, soda ash or caustic soda, and again leaching.

The relative efficiencies of ordinary wood charcoal and the alkali-treated carbonaceous materials are approximately of the order indicated in the following table, based upon the experimental results obtained in the treatment of a cyanid solution carrying $74.50 of gold per ton (gold at $20.00 per ounce), the solution being passed under otherwise identical conditions (fineness of carbon, temperature, etc.) through the various forms of carbon disposed as a filtering layer $\frac{3}{4}''$ in depth. The rate of flow of solution in each case was $\frac{3}{8}$ lb. per minute per square foot of filtering area. The filtrate was found to carry the following values in gold per ton of liquid:

| | |
|---|---|
| Ordinary wood charcoal | $35.00 |
| Leached black ash | 0.04 |
| Leached black ash re-treated with soda ash | 0.02 |
| Leached black ash re-treated with caustic soda | 0.02 |

I do not desire to limit myself to any theory concerning the reasons underlying the results above noted. I have observed however that dilute acid-treated charcoals, such for instance as those prepared using dilute acid in accordance with my prior Patent 1,133,049, patented March 23, 1915, although highly effective as decolorizing agents for sugar solutions or the like, are comparatively ineffective as precipitants for gold or silver: whereas alkali-treated carbons prepared in accordance with the present invention are relatively inefficient decolorizers but are excellent precipitants for metal values. It may therefore be considered that the adsorbent carbons function as colloidal substances, and as such, when given a positive charge, will adsorb or combine with negatively charged materials: and conversely, when given a negative charge, will adsorb or combine with positively charged materials.

I claim:—

1. The method of recovering gold and silver from their solutions, comprising bringing such solutions into contact with carbon preliminarily subjected to an alkaline treatment at a sufficient temperature and thereafter leached.

2. The method of recovering gold and silver from their solutions, comprising bringing such solutions into contact with leached black ash residues from soda pulp manufacture.

In testimony whereof, I affix my signature.

RALPH H. McKEE.